Oct. 10, 1961  J. A. RICKARD  3,004,161
METHOD OF WELL LOGGING

Filed May 22, 1957  2 Sheets-Sheet 1

INVENTOR.
JAMES A. RICKARD,
BY John S. Schneider
ATTORNEY.

Oct. 10, 1961 J. A. RICKARD 3,004,161
METHOD OF WELL LOGGING
Filed May 22, 1957 2 Sheets-Sheet 2
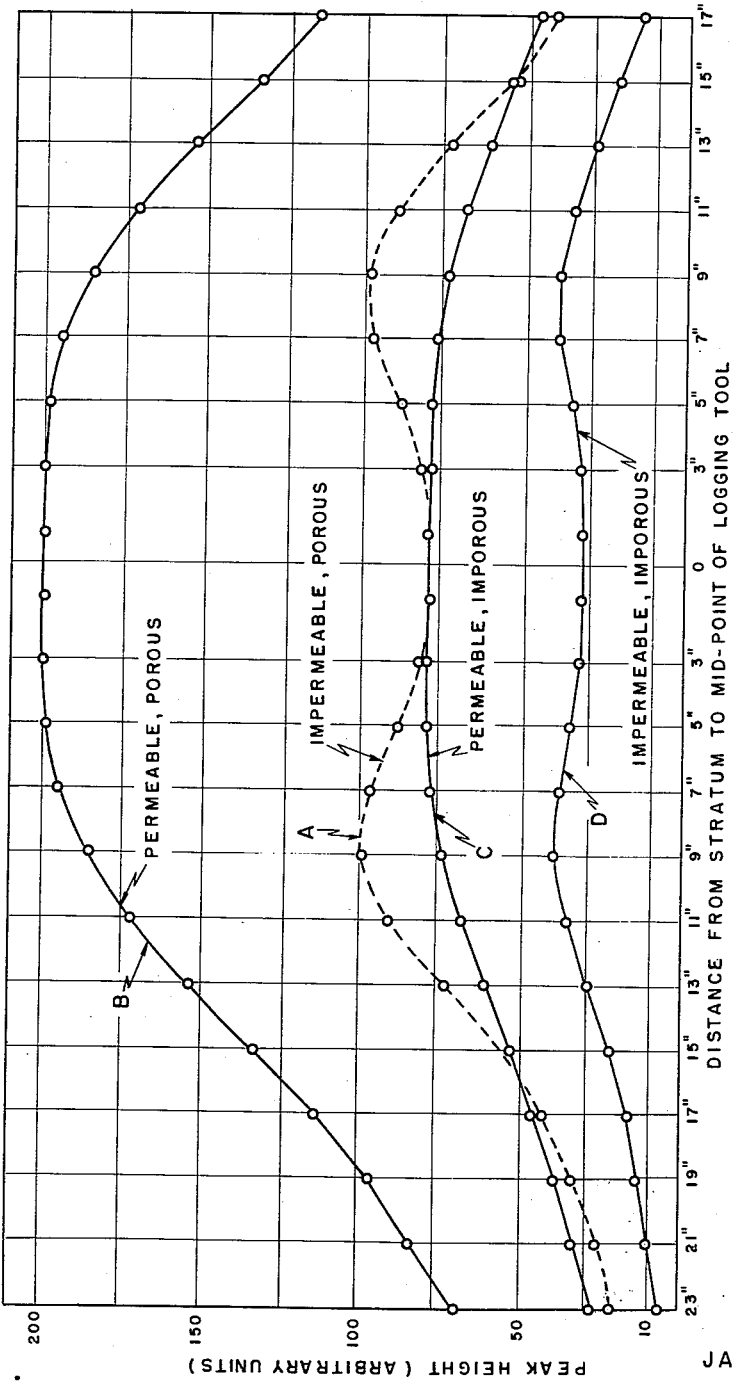
FIG. 5.
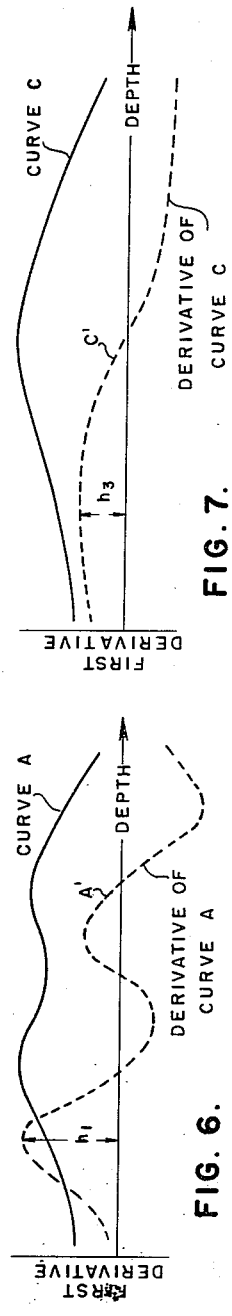
FIG. 6.
FIG. 7.
INVENTOR.
JAMES A. RICKARD,
BY John S. Schneider
ATTORNEY.

United States Patent Office 3,004,161
Patented Oct. 10, 1961

3,004,161
METHOD OF WELL LOGGING
James A. Rickard, Bellaire, Tex., assignor, by mesne assignments, to Jersey Production Research Company, Tulsa, Okla., a corporation of Delaware
Filed May 22, 1957, Ser. No. 660,950
4 Claims. (Cl. 250—83.3)

This invention is directed to a method for logging boreholes wherein formation characteristics of permeability and porosity are selectively distinguished.

The determination of permeability, impermeability, porosity and imporosity of subsurface formations is important in prospecting for oil deposits since oil deposits commonly occur in the vicinity of highly porous structures or formations. These characteristics also are important for other reasons, such as identifying unknown formations, correlating the formations penetrated by one well with those penetrated by another well, etc.

The term "permeabilitly" refers to a physical property of a formation and is determined by measuring the resistance to the flow of fluid through the formation under the conditions of viscous flow.

The effective "porosity" of a rock or formation is a ratio of the volume of interconnected pore space to the total bulk volume of the rock expressed as a percentage.

Various methods have been employed for determining characteristics of invaded zones in a borehole. One method employed consists of adding a radioactive tracer to drilling fluid and then detecting by a suitable logger the radiations emitted therefrom. Information is obtained pertaining to an area of lost returns; also, permeable or porous zones or both may be found, cavernous formations may be located, etc.

Also, a method of adding a tracer to drilling fluid, which tracer is not of itself radioactive, but which can be induced to become radioactive by suitable means is known. Such a method has been employed, for example, to locate cement behind a casing, to mark accurately a significant formation level, to determine the presence and thickness of a mud cake and to indicate the degree or speed of the circulation of drilling liquids. A method also is known in which material capable of emitting gamma radiation when irradiated is placed in the borehole and subjected to hydrostatic pressure to force the material into the formation. A neutron radiation source and a gamma ray detector are positioned adjacent the formation and while maintaining this instrumentation stationary the formation is bombarded with neutrons and the induced gamma radiation is detected. In this method the rate of increase of counting rate is interpreted as indicating the permeability of the formation.

Although neutron bombardment and detection of resulting gamma radiation is described herein and is preferred as the source and detected radiation respectively, any desired primary source of radiation and the resulting secondary radiation may be employed such as a source of strong gamma radiation and detection of resulting neutrons.

The tracer is a substance not normally found in the subsurface formations or borehole and may be added to the formations after drilling operations or may be added to the mud at any time during drilling operations.

Preferably the tracer substance is a high neutron gamma $(n,\gamma)$ yield substance. Elements suitable for use as tracers are gadolinium, samarium, cadmium, dysprosium, boron, mercury and other elements having a high $(n,\gamma)$ yield.

The present invention provides a method whereby both the porosity and permeability of subsurface formations may be determined in a continuous logging run.

Briefly, the invention concerns a method for distinguishing subsurface formation characteristics of permeability and porosity utilizing a logging tool including a primary source of bombarding radiation and a detector to detect induced secondary radiation which comprises adding a tracer, adapted to become radioactive upon bombardment by said primary radiation, to subsurface formations. Then, traversing the borehole with said logging tool to irradiate the subsurface formations with primary radiation and to detect the secondary radiation induced thereby, recording the detected secondary radiation counting rate vs. the depth of the bore hole traversed and then selectively distinguishing the formations by characteristics of permeability and porosity, impermeability and porosity, permeability and imporosity and impermeability and imporosity by means of the slope characteristics of the recorded curve. Additionally, the impermeable-porous formation is distinguished from the impermeable-imporous formation by analyzing the plot characteristics by means of differentiating circuits.

Thus, an object of the present invention is to provide a method of continuous well logging utilizing a primary radiation source to produce secondary radiation of discrete energy dependent upon the nature of an additive material on order to determine characteristics of subsurface formations.

An additional object of this invention is to introduce an additive material into the borehole in the logging method for determining formation characteristics, which material is in itself not radioactive and thus will have no health hazard or adverse effect on future radioactive logging methods which may be attempted in the same well bore.

A further object of this invention is to separately measure and evaluate both porosity and permeability of each subsurface formation traversed by the borehole.

Further, an object of this invention is to provide a method for measuring characteristics of permeability and porosity in conjunction with methods wherein the subsurface formations are qualitatively and quantitatively logged in order to determine the presence and amounts of specific chemical elements in the subsurface formations.

The method whereby the presence and amounts of specific chemical elements are determined by measuring or analyzing the induced radiation resulting from bombardment of such formations is described in U.S. applications Serial Nos. 504,825 and 534,234, filed April 29, 1955 and September 14, 1955, respectively, entitled "Method of Well Logging" and "Radioactive Logging Method;" respectively, by James A. Rickard.

Other objects of this invention will be apparent from a description of this invention taken in conjunction with the drawings wherein:

FIG. 5 is a plot of gamma ray counting rate (peak height) utilizing arbitrary units vs. the distance from the stratum to the center of the logging tool showing curves for permeable-porous, impermeable-porous, permeable-imporous and impermeable-imporous formations;

FIG. 6 illustrates the first derivative of the impermeable-porous curve of FIG. 5;

FIG. 7 is the first derivative of the permeable-imporous curve of FIG. 5.

Figure 1:
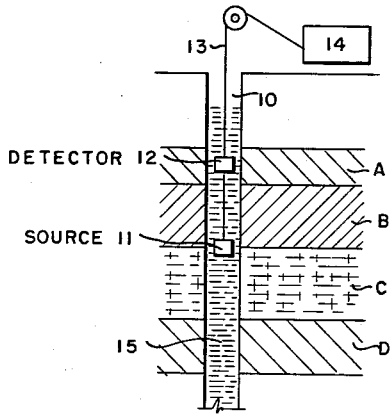
FIG. 1 illustrates diagrammatically a portion of a borehole traversing a plurality of formations and a logging tool arranged in the borehole.

For a more detailed description of the operation of the invention, reference is made to FIG. 1 wherein is shown a borehole 10 traversing a plurality of subsurface formations A, B, C and D, which are for purposes of illustration, impermeable-porous, permeable-porous, permeable-imporous and impermeable-imporous, respectively. A neutron source 11 and a gamma ray detector 12 spaced therefrom are positioned on an electrically conductive cable 13 connected to suitable analyzing equipment 14 positioned at the surface of the earth. The borehole 10 contains drilling or circulating fluid 15. Suitable shielding (not shown) may be provided to insure that detector 12 detects only induced radiation resulting from primary radiation which has penetrated the formations.

Figure 2:
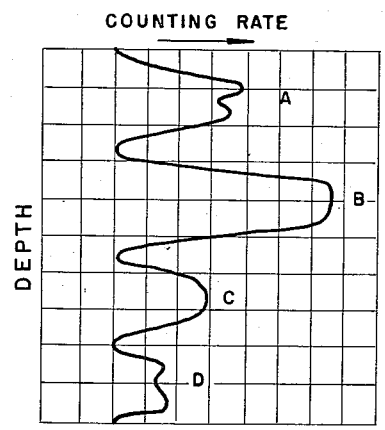
FIG. 2 is a curve showing variations in gamma ray counting rate with respect to depth of the borehole for the formations traversed shown in FIG. 1.

The peaks and valleys of the curve of FIG. 2 show the variations in permeability and porosity characteristics of typical formations similar to A, B, C and D.

Figure 3:
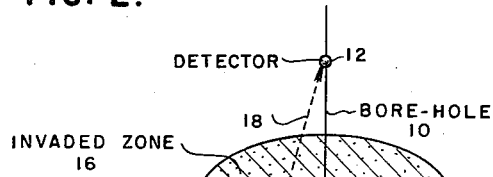
FIG. 3 is a schematic illustration of the invaded zone relative to the borehole according to the method of the invention.

For an analysis of the method of the invention reference is made to FIG. 3 wherein the borehole 10 is shown surrounded by an invaded zone 16 which has been penetrated by drilling fluid 15. The source 11 and detector 12 are shown spaced apart and the neutron bombardment is illustrated by arrowed line 17 and the induced gamma radiation detected is illustrated by the dotted line 18. The volume and shape of the invaded zone 16 affects the detector counting rate. The contribution of each portion of the volume of zone 16 may be calculated using well known mathematical and nuclear physics methods. For purposes of discussion, however, a "reactive center" may be defined as a small ring shaped volume situated somewhere within the invaded region such that if all the additive material were concentrated there, the net effect upon the counting rate of the detector 12 would be exactly the same.

Figure 4:
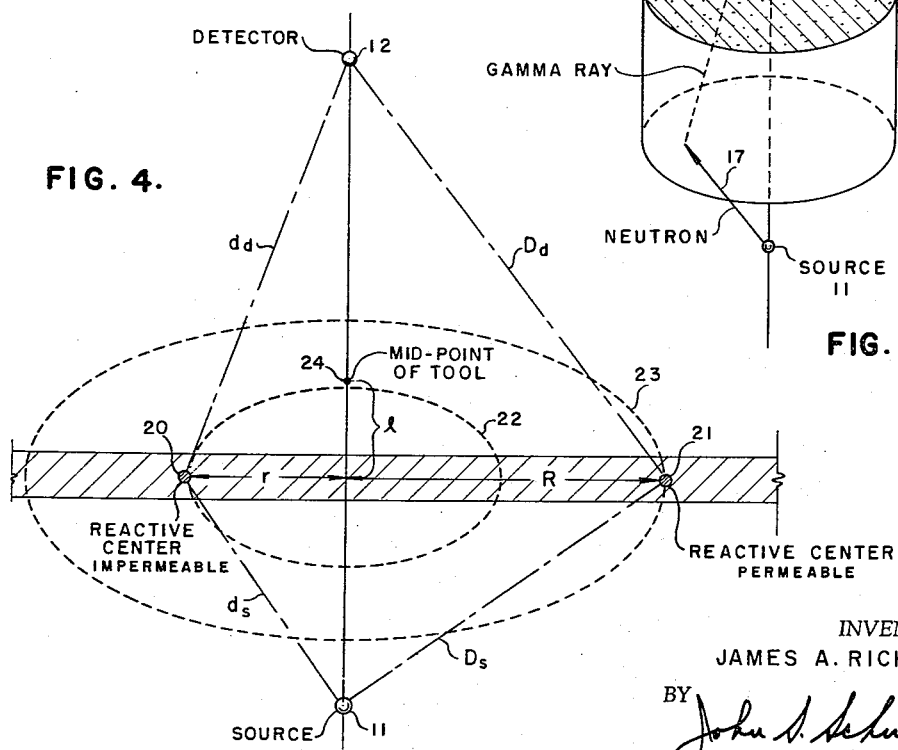
FIG. 4 is a schematic illustration of the invaded zone including the reactive centers" relative to the borehole according to the invention.

As illustrated in FIG. 4 for purposes of calculations, the "reactive center" of an impermeable formation has been chosen as 5 inches from a small well bore indicated as at 20 and the "reactive center" of a permeable formation has been chosen as 10 inches from the well bore as indicated at 21. The radii of the rings 22 and 23 formed by "reactive centers" 20 and 21, respectively, are designated $r$ and $R$, respectively. The distance between the source 11 and the detector 12 was chosen as 20 inches. The midpoint of the logging tool is designated 24 and the vertical distance of the midpoint 24 from the horizontal plane of the "reactive centers" 20 and 21 is designated L.

The counting rate is a function of a large number of variables. For purposes of this analysis, factors such as source strength, nuclear cross-section, detector efficiency, etc. are included in a "K" term which does not vary from formation to formation. The counting rate is a function of the number of atoms in the "reactive center," which, in turn, is proportional to the circumference of the rings, 22 or 23. Therefore, the counting rate is proportional to $5^2$ ($r^2$) and $10^2$ ($R^2$), when considering "reactive centers" 20 and 21, respectively.

The counting rate is inversely proportional to the distance from the source to the "reactive center" and from the "reactive center" to the detector; hence CR (counting rate) is proportional to $$\frac{1}{d_s d_d} \text{ or } \frac{1}{D_d D_s}$$

wherein $d_d$ is the distance from the "reactive center" 20 to detector 12, $d_s$ is the distance from the "reactive center" 20 to source 11, $D_d$ is the distance from "reactive center" 21 to detector 12, and $D_s$ is the distance between the "reactive center" 21 and source 11. Thus, an all inclusive summary is $$CR = \frac{Kr^2}{d_s d_d} \text{ or } CR = \frac{KR^2}{D_d D_s}$$

To illustrate the invention various formations with different characteristics may be considered.

Thus, as represented in FIGS. 1 and 5, these formations are (A) an impermeable-porous formation; (B) a permeable-porous formation; (C) a permeable-imporous formation; and (D) an impermeable-imporous formation.

Table I shows the data from which the curves of FIG. 5 were obtained.

*Table I*

| (1) | (2) | (3) | (4) | (5) | (6) | (7) | (8) | (9) |
|---|---|---|---|---|---|---|---|---|
|  |  |  |  |  | Counting Rate (CR) | | | |
| L | $d_d$ | $d_s$ | $D_d$ | $D_s$ | I.P. | P.P. | P.I. | I.I. |
| 23 | 34.4 | 13.9 | 34.5 | 16.4 | 209 | 703 | 283 | 84 |
| 21 | 31.4 | 12.1 | 32.5 | 14.9 | 263 | 826 | 333 | 106 |
| 19 | 29.4 | 10.3 | 30.6 | 13.5 | 330 | 968 | 390 | 133 |
| 17 | 27.4 | 8.7 | 28.7 | 12.2 | 419 | 1,140 | 460 | 169 |
| 15 | 25.4 | 7.1 | 26.9 | 11.2 | 554 | 1,326 | 535 | 223 |
| 13 | 23.6 | 5.8 | 25.1 | 10.4 | 730 | 1,531 | 618 | 294 |
| 11 | 21.6 | 5.1 | 23.2 | 10.1 | 908 | 1,706 | 688 | 366 |
| 9 | 19.7 | 5.1 | 21.4 | 10.1 | 995 | 1,850 | 746 | 401 |
| 7 | 17.7 | 5.8 | 19.7 | 10.4 | 973 | 1,951 | 787 | 393 |
| 5 | 15.8 | 7.1 | 18.0 | 11.2 | 891 | 1,983 | 800 | 359 |
| 3 | 13.9 | 8.7 | 16.4 | 12.2 | 818 | 1,999 | 806 | 323 |
| 1 | 12.1 | 10.3 | 14.9 | 13.5 | 802 | 1,988 | 802 | 324 |
| −1 | 10.3 | 12.1 | 13.5 | 14.9 | 802 | 1,988 | 802 | 324 |
| DATA IS SYMMETRICAL | | | | | | | | |
| −3 | ---- | ---- | ---- | ---- | ---- | ---- | ---- | ---- |
| −5 | ---- | ---- | ---- | ---- | ---- | ---- | ---- | ---- |
| −7 | ---- | ---- | ---- | ---- | ---- | ---- | ---- | ---- |

Column L lists various distances "$l$" of the midpoint 24 above the horizontal plane of the "reactive centers."

Columns 2 through 5 list the approximate distances $d_d$, $d_s$, $D_d$ and $D_s$, respectively, for the various distances "$l$."

Columns 6 through 9 list the counting rates in arbitrary units for the impermeable-porous (I.P.), permeable-porous (P.P.), permeable-imporous (P.I.) and impermeable-imporous (I.I.), respectively, for the various distances "$l$."

The data of column 6 were obtained from the equation:

$$CR = \frac{K(5)^2}{d_d d_s}$$

The data of column 7 were obtained from the equation:

$$CR = \frac{K(10)^2}{D_d D_s}$$

The data of columns 8 and 9 were obtained by assuming a porosity of 40.3% of the porosity of the formations represented by columns 7 and 6, respectively. Thus, the data of columns 8 and 9 were obtained from the equations:

$$CR = \frac{0.403 K(10)^2}{D_d D_s}$$

and $$CR = \frac{0.403 K(5)^2}{d_d d_s}$$

respectively.

Since the data obtained will be symmetrical when the midpoint 24 is below the horizontal plane of the "reactive centers" to the data obtained when the midpoint 24 is above the horizontal plane of "reactive centers," tabulation of the former has been omitted.

As noted the numeral .403 used in the equations to obtain the data for columns 8 and 9 is obtained from the ratio of columns 6 and 7 for the position of midpoint of the logging tool at "$l$" equals 1 or −1. Thus, 802 divided by 1988 equals 0.4034 or 40.3%.

Curves A, B, C and D of FIG. 5 are based upon the data of columns 6, 7, 8 and 9, respectively.

As noted supra, curve C represents a formation which has a permeability equal to that of the formation represented by curve B so that its "reaction center" was situated at the same point in space; however, the formation C was only 40.3% as porous as formation B.

Curve D represents a formation as imporous as formation C and as impermeable as formation A. Therefore, permeable-porous formations (curve B) may be readily distinguished from impermeable-imporous formations (curve D).

Although, generally, a formation that is permeable is also porous and vice-versa, a formation may be permeable and imporous (curve C) or impermeable and porous (curve A). By the method of this invention, a distinction between these latter two type formations can be made. Thus, a comparison of curves A and C reveal considerable difference. Curve A is of the peak and valley nature whereas curve C has a smooth peak of curve. Another significant difference is the rate of rise or slope of the curves. For example, curve A has a much higher slope or first differential than curve C. By analyzing the peaks of curves A and C by means of differentiating circuits, easy and convenient distinctions can be made between the curves. Such differentiating circuits are well known and a description of the essential features of differentiating circuits may be found in well known text books; for example, Seely's Electron Tube Circuits, 1950, pages 129–133. A differential curve as seen in FIG. 6 taken from curve A would appear as curve A', and as seen in FIG. 7, a differential curve taken from curve C would appear as curve C'. The maximum rise of the derivative curves shown above as $h_1$ and $h_3$ in FIGS. 6 and 7, respectively, indicate the slopes of the original response curves A and C, respectively. As seen in FIGS. 6 and 7, $h_1$ is greater than $h_3$. This indicates that curve A was obtained from an impermeable-porous formation, while curve C was obtained from a permeable-imporous formation.

Thus, by the method of this invention, the characteristics of permeability and porosity of the subsurface formations may be obtained by analyzing the curves of the actual logging run.

Having fully described the nature, objects and elements of my invention, I claim:

1. A method for logging a borehole traversing subsurface formations for distinguishing subsurface formation characteristics of permeability and porosity in a continuous logging run utilizing a source of primary radiation and a detector for detecting the induced secondary radiation resulting from bombardment by said primary radiation comprising adding a material adapted to become radioactive upon bombardment by said primary radiation to said subsurface formations to be traversed by said source and detector, traversing the borehole in said continuous logging run with said source and detector to irradiate the subsurface formations with primary radiation and to detect the secondary radiation induced thereby, and recording the detected induced radiation counting rate versus depth of borehole traversed, the slope characteristics of the induced secondary radiation counting rates being indications of formation characteristics of permeability and porosity, the curve indicating a permeable porous formation having the greatest slope, the curve indicating an impermeable imporous formation having the least slope and the curves indicating impermeable porous and permeable imporous formations having slopes intermediate therebetween, the slopes of said curves indicating impermeable porous and permeable imporous formations being further distinguished by obtaining first derivatives of said curves, the first derivative of said curve indicating an impermeable porous formation having three zero crossings and the first derivative of said curve indicating a permeable imporous formation having one zero crossing.

2. A method in accordance with claim 1 wherein the material subject to irradiation is added to the formations during well drilling operations.

3. A method for logging a borehole traversing subsurface formations for distinguishing subsurface formation characteristics of permeability and porosity in a continuous logging run utilizing a neutron source and gamma ray detector comprising adding a fluid containing a high neutron gamma yield substance to the subsurface formations to be traversed by said source and detector, traversing the borehole in said continuous logging run with said source and detector to irradiate the subsurface formations with neutrons and to detect the gamma radiation induced thereby, and recording the detected gamma radiation counting rate versus depth of the borehole traversed, the slope characteristics of the induced secondary radiation counting rates being indications of formation characteristics of permeability and porosity, the curve indicating a permeable porous formation having the greatest slope, the curve indicating an impermeable imporous formation having the least slope and the curves indicating impermeable porous and permeable imporous formations having slopes intermediate therebetween, the slopes of said curves indicating impermeable porous and permeable imporous formations being further distinguished by obtaining first derivatives of said curves, the first derivative of said curve indicating an impermeable porous formation having three zero crossings and the first derivative of said curve indicating a permeable imporous formation having one zero crossing.

4. A method for logging a borehole traversing subsurface formations for determining presence and amounts of selected chemical elements contained in said subsurface formations and for distinguishing subsurface formation characteristics of permeability and porosity in a continuous logging run utilizing a source of primary radiation and a detector for detecting the resulting induced secondary radiation comprising adding a substance adapted to become radioactive upon bombardment by said primary radiation to the subsurface formations to be traversed by said source and detector, traversing the borehole in said continuous logging run with said source and detector to irradiate the subsurface formations with primary radiation and to detect the secondary radiation induced thereby, and recording the detected secondary radiation counting rate characteristic of selected chemical elements including said added substance versus depth of the borehole traversed, the slope characteristics of the induced secondary radiation counting rates being indications of formation characteristics of permeability and porosity, the curve indicating a permeable porous formation having the greatest slope, the curve indicating an impermeable imporous formation having the least slope and the curves indicating impermeable porous and permeable imporous formations having slopes intermediate therebetween, the slopes of said curves indicating impermeable porous and permeable imporous formations being further distinguished by obtaining first derivatives of said curves, the first derivative of said curve indicating an impermeable porous formation having three zero crossings and the first derivative of said curve indicating a permeable imporous formation having one zero crossing.

References Cited in the file of this patent

UNITED STATES PATENTS

| | | |
|---|---|---|
| 2,443,680 | Herzog | June 22, 1948 |
| 2,480,674 | Russell | Aug. 30, 1949 |
| 2,484,422 | Muskat | Oct. 11, 1949 |
| 2,583,288 | Arps | Jan. 22, 1952 |
| 2,710,925 | McKay | June 14, 1955 |
| 2,747,099 | Nowak | May 22, 1956 |
| 2,749,444 | Shea | June 5, 1956 |
| 2,805,346 | Piety | Sept. 3, 1957 |